United States Patent [19]

Bach et al.

[11] Patent Number: 4,675,138
[45] Date of Patent: Jun. 23, 1987

[54] PROCESS FOR THE MANUFACTURE OF A CORRUGATED WAFER BOARD PANEL

[75] Inventors: Lars Bach; Eduard Stark, both of Edmonton, Canada

[73] Assignee: Her Majesty the Queen in Right of the Province of Alberta as Represented by the Minister of Energy and Natural Resources, Edmonton, Canada

[21] Appl. No.: 877,338

[22] Filed: Jun. 23, 1986

Related U.S. Application Data

[62] Division of Ser. No. 765,840, Aug. 15, 1985, Pat. No. 4,616,991.

[51] Int. Cl.⁴ .............................................. B29C 59/02
[52] U.S. Cl. .................................... 264/294; 264/118; 264/119; 264/120
[58] Field of Search ............... 264/120, 119, 118, 324, 264/325, 294, 295; 425/336, 340, 383, 394, 396, 406, 407, 409, 369; 156/62.2, 205, 210, 219

[56] References Cited

U.S. PATENT DOCUMENTS 771,677  10/1904  Squires ................................. 425/396
4,559,194  12/1985  Hegenstaller ........................ 264/113

FOREIGN PATENT DOCUMENTS 806209  12/1958  United Kingdom .............. 156/62.2

Primary Examiner—Jan H. Silbaugh
Assistant Examiner—Mary Lynn Fertig
Attorney, Agent, or Firm—Ernest Peter Johnson

[57] ABSTRACT

A platen assembly is provided having a working surface which can be mechanically converted between planar and corrugated configurations. A mat of wood wafers coated with thermosetting resin binder is deposited between upper and lower, spaced apart platen assemblies of this type. The platen assemblies, in the planar configuration, are then pressed together to a limited extent to pre-compress the mat to fix the wafers. Horizontal force is then applied to the platen assemblies to convert them to the corrugated configuration, with the pre-compressed mat retained therebetween. The mat is therefore forced to adopt a corrugated form. The platen assemblies are then further pressed together and heated, to cure the resin and produce a corrugated wafer board panel.

1 Claim, 10 Drawing Figures

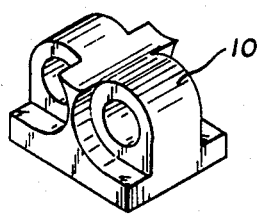
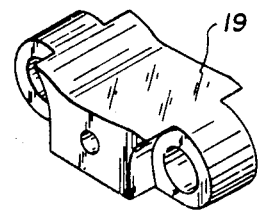
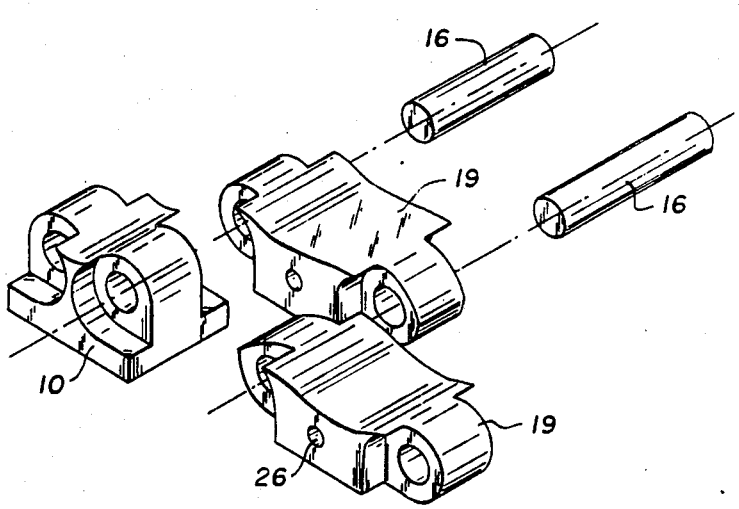

PROCESS FOR THE MANUFACTURE OF A CORRUGATED WAFER BOARD PANEL

This application is a division of application Ser. No. 765,840, filed Aug. 15, 1985, now U.S. Pat. No. 4,616,991.

FIELD OF THE INVENTION

The present invention relates to a process and apparatus for the manufacture of a corrugated wafer board panel.

BACKGROUND OF THE INVENTION

Typically, a wafer board panel comprises layers of wood flakes or wafers formed into a composite structure using a resinous binder. The preparation of wafer board panels is complex, but broadly consists of two principal stages. The first stage comprises the preparation of the wafers and the admixing thereof with the binder to form a loose layer or mat; the second stage involves subsequent compression and heating of the mat to cure the resin and form the consolidated panel.

At present, wafer board is manufactured in the form of planar or flat sheets. The cost of production of such wafer board panels is economically attractive, because a low grade timber may be utilized as the raw feedstock. Wafer board is a recognized structural panel, finding wide application in the construction industry, particularly as a plywood substitute in residential construction.

Inherent disadvantages of wafer board panels, of planar configuration, reside in the low structural stiffness and strength thereof, which fall much below that of the more costly plywood.

Improvement in the performance characteristics of flat wafer board panels has been attained by optimization of such parameters as wafer orientation, wafer geometry, resin selection and content, and the like. However, existing technology would appear to have exhausted these possibilities of increasing structural strength.

In an attempt to improve the flexural strength characteristics of wafer board panels, applicants contemplated the provision of a wafer board panel having a corrugated configuration. The fundamental concept of corrugating materials to thereby improve the structural properties is not a novel one.

A method which readily comes to mind, for providing a corrugated wafer board panel involves placing a flat resin-coated wood flake mat between corrugated platens and heating and compressing the mat therebetween. However, this approach has not been successful because the mat must elongate to assume the form of the corrugated platens. Due to the unlocked state of the wafers, they tend to shift in certain portions of the mat during the compression-elongation operation and the compressed product is characterized by density variations.

Thus, to form the mat by compression and heating of a planar mat between corrugated platens results in a panel of non-uniform density because of the freely displaceable characteristics of the flakes. Alteration of the mat from the planar to the corrugated configuration entails 'stretching' or increasing the length thereof, with resulting unevenness in the density thereof occurring.

SUMMARY OF THE INVENTION

In a contrasting approach, applicants provide spaced apart upper and lower platens, each of which is convertible between substantially planar and corrugated configurations. The platens each supply a steel or like working surface which is of sufficient size to form a panel, is substantially non-porous, and is convertible between the two configurations. (By 'non-porous' is meant that the wood wafers are retained by the platen surface.)

Having developed the platens, it then became possible to practise the following novel combination of fabrication steps, namely:

(a) distributing a mat of loose wood wafers between upper and lower platen surfaces maintained in the planar configuration;

(b) biasing the platens together to pre-compress the mat, to thereby substantially fix the wafers together and limit their further relative movement;

(c) then converting the two platen surfaces, still in pressing association with the mat, from the planar to the corrugated configuration; and (d) then applying additional pressure and heat for a sufficient time to cure the binder and produce a corrugated wafer board.

The main advantage of the process is that the panel product is found to have generally constant density.

Broadly stated, the invention in an apparatus aspect comprises a platen assembly, for use in forming corrugated wafer board panels, comprising: support means forming a planar support surface; parallel, spaced apart, elongate end members forming inner working faces that are generally perpendicular to the support surface, at least one of said end members being movable toward the other along the support surface while remaining parallel thereto; a plurality of elongate bracing elements positioned on the support surface in spaced relationship, between the end members, said bracing elements being slidable along the surface in parallel relationship; link means, pivotally interconnecting each pair of adjacent bracing elements, for providing in conjunction with said bracing elements a broad substantially non-porous platen surface whose configuration can be mechanically converted between a substantially planar form and a corrugated form; and means for moving the end members together and apart to convert the link means between the corrugated and planar forms.

In a process aspect, the invention comprises distributing a mat of loose binder-coated wood wafers between a pair of spaced apart, substantially horizontally disposed platens having substantially non-porous and planar platen surfaces, said platens being adapted to be mechanically actuated to move the surfaces together and, when further required, to be converted from the planar configuration to a corrugated configuration by application of a side force; biasing the platens together vertically to pre-compress the mat between the planar surfaces, to substantially fix the wafers together to limit their further relative movement; then converting the two platens and their platen surfaces, still in pressing association with the mat, from the planar to the corrugated configuration; and applying heat and additional pressure with the platen surfaces to the mat for sufficient time to cure the binder and produce a corrugated wafer board panel.

DESCRIPTION OF THE DRAWINGS

FIG. 6 is a perspective view showing the inverted T-type bracing member;

FIG. 7 is a perspective view showing the T-type link; and

FIG. 8 is a perspective exploded view showing a bracing member, two links, and connecting rods.

DESCRIPTION OF THE PREFERRED EMBODIMENT

Figure 1A:
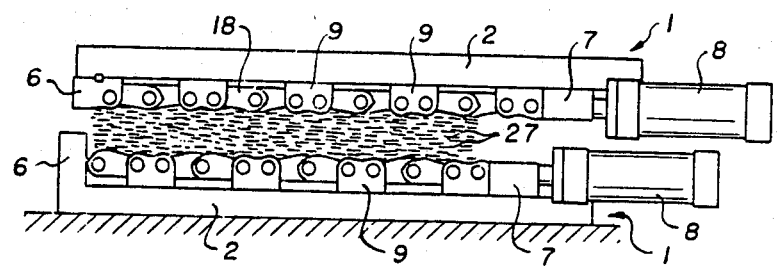
FIGS. 1a, 1b and 1c are schematic side views showing top and bottom platen assemblies in the three stages of the process for production of a corrugated wafer board panel in accordance with this invention.

Having reference to the drawing, there is shown a platen assembly 1 which includes a base plate 2. The base plate 2 illustrated is a flat, rectangular, solid steel block having longitudinal edges 3 and end edges 4.

Four elongate key-ways 5 are cut in the surface of the base plate 2. The key-ways 5 are parallel and extend longitudinally the length of the base plate 2 at spaced points across its width.

An elongate, bar-like stop member 6 is affixed to the base plate 2 along one end edge thereof, to extend transversely thereacross.

An elongate, bar-like biasing member 7 is positioned on the base plate 2 along its other end edge, in opposed relation to the stop member 6. The biasing member 7 has keys (not shown), protruding downwardly from its base, for engaging the key-ways 5. Thus the transversely extending biasing member 7 is arranged to be slidable along the base plate 2 toward the stop member 6, the walls of the key-ways 5 being operative to maintain the biasing member 7 parallel to the stop member.

The stop member 6 and biasing member 7 form end members for a convertible platen to be described.

A pair of double-acting hydraulic cylinders 8 are secured to the base plate 2 at one end thereof in spaced apart relationship. Said cylinders 8 extend longitudinally parallel to the main plane of the base plate 2. The pistons 8a of the cylinders are connected to the biasing member 7. Extension or contraction of the cylinders 8 serves to advance or retract the biasing member 7, along the key-ways 5, toward or away from the stop member 6 and parallel thereto.

Spaced apart rows 9 of abutting bracing members 10 extend transversely across the base plate 2 parallel to the stop and biasing members 6, 7.

Figure 2:
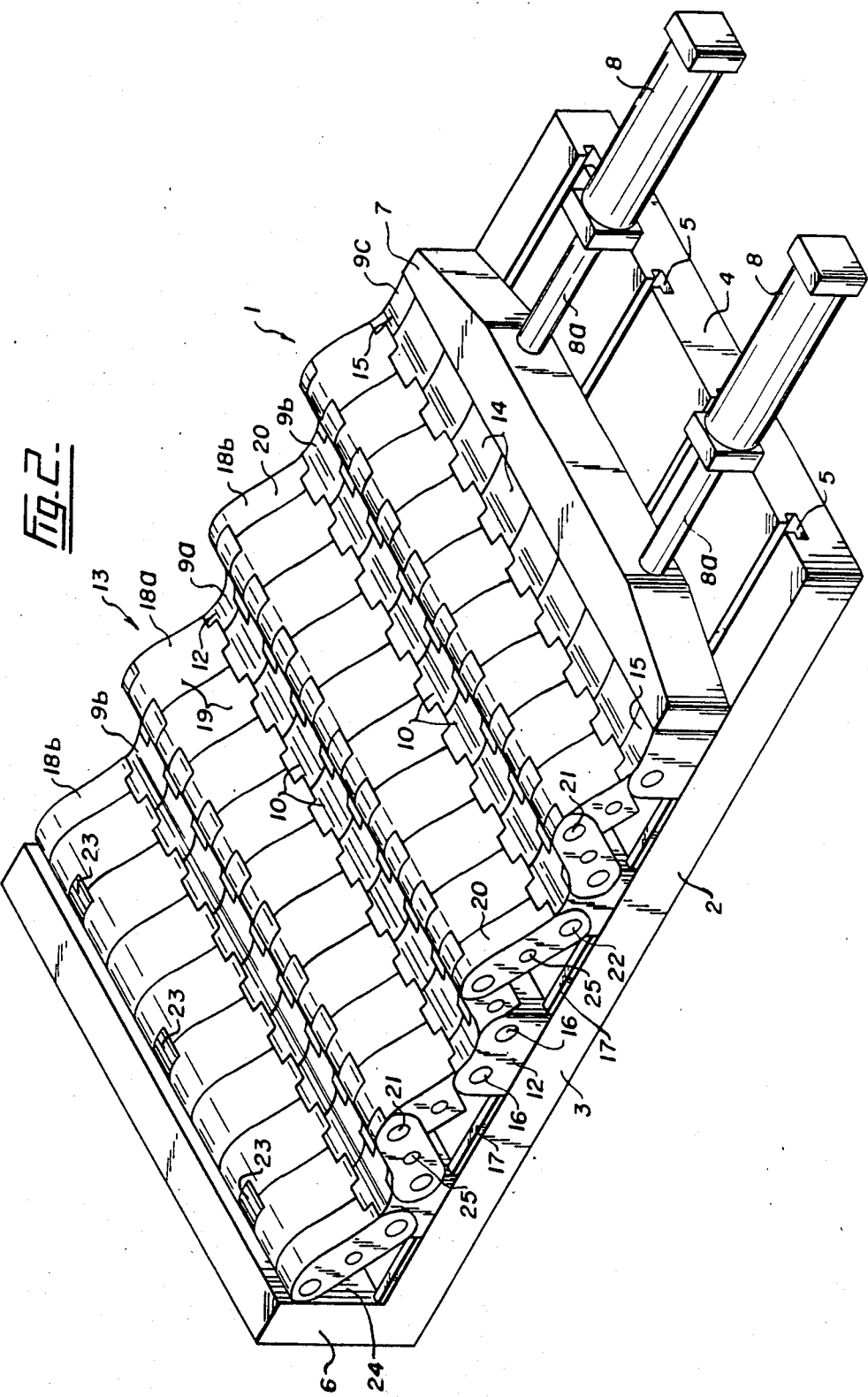
FIG. 2 is a perspective view of the platen assembly showing the links in the corrugated position.
Figure 3:
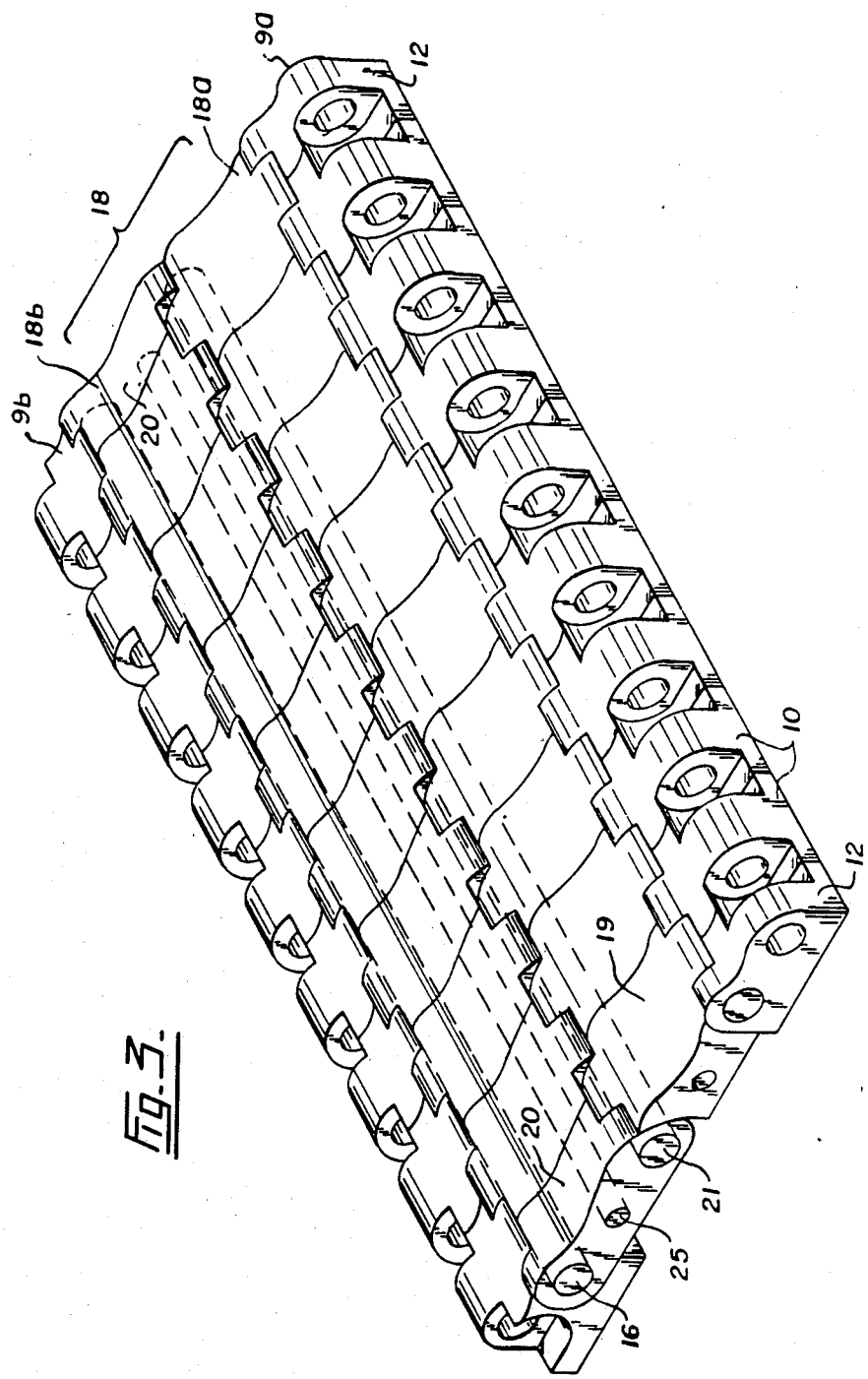
FIG. 3 is a perspective view showing a link unit in the planar position.
Figure 4:
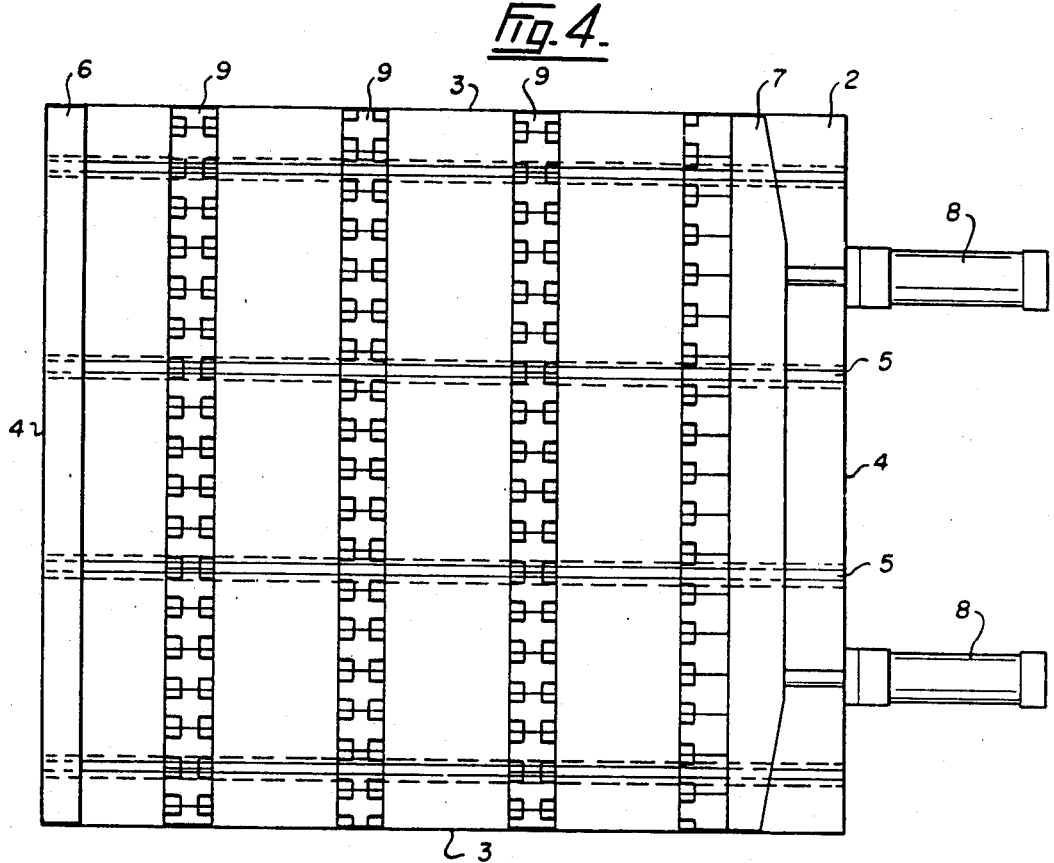
FIG. 4 is a top plan view showing the base plate, bracing members, key-ways, biasing and stop members, and the cylinders.
Figure 5:
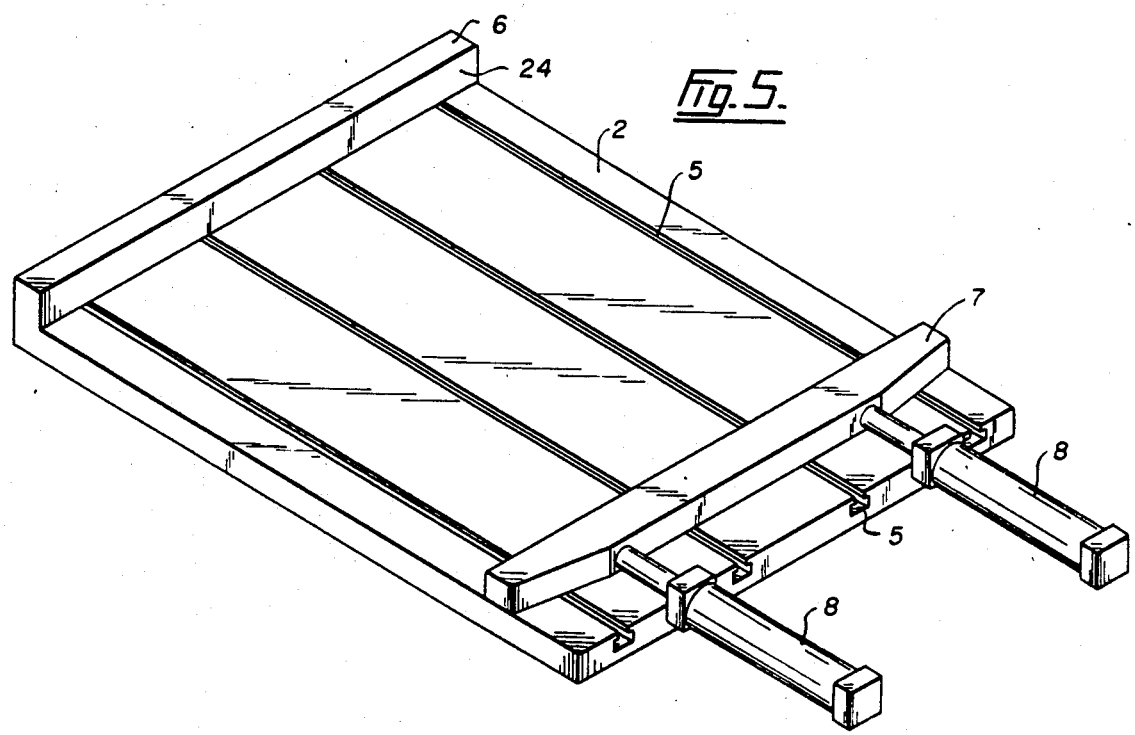
FIG. 5 is a perspective view showing the base plate, biasing and stop members, and the cylinders.

As can be seen in FIGS. 2 and 3, each bracing element or row 9 is comprised of "entire" bracing members (as illustrated in FIG. 6), or sections thereof. More particularly, a first row 9a comprises a linear array of entire bracing members 10; at each end of the array, there is positioned an end bracing member 12. Said end bracing member 12 is a longitudinal half section of an entire bracing member. The adjacent second row 9b is formed only of entire bracing members 11.

Rows 9a and 9b are repeated sequentially, as required to form the bulk of a platen 13 of a desired length. However, at the biasing member end of the platen 13, an end row 9c is provided. Row 9c is formed of an array of bracing members 14 having an end bracing member 15 positioned at each end thereof. The bracing members 14 are each a transverse half section of an entire bracing member 11; the end bracing members 15 are each a transverse and longitudinal half section of an entire bracing member 11.

The bracing members which together make up each of the rows 9a, 9b, 9c are held together by rods 16 which extend through suitable transverse bores formed in said members.

The individual bracing members positioned over the key-ways 5 are provided with downwardly projecting keys (not shown), which engage said key-ways.

Thus, each row of bracing members extends transversely across the base plate 2 in parallel relationship to the biasing member 7 and the stop member 6. The bracing members in each row abut one another in closely positioned, consolidated formation. Each row is slidable as a unit along the length of the base plate 2. And the walls of the key-ways 5 cooperate with the bracing member keys to maintain the parallel disposition of the rows as they are biased along the base plate 2.

An elongate, flat spacer 17 is positioned between each pair of adjacent rows of bracing members. When the platen 13 is in the extended position, the spacers 17 extend across only part of the gaps existing between adjacent rows. Thus the rows of bracing members may each be moved through a limited pre-determined distance or travel as the biasing member 7 pushes the rows and spacers into abutting relationship against the stop member 6. Given that the spacer and gap between each pair of rows are of common widths, the distance through which the various rows can be shifted is the same.

In broad summary, therefore, there is provided:

(a) a planar support surface;

(b) parallel, spaced apart, elongate members (the stop and biasing members) forming inner working faces which are generally perpendicular to the support surface and which are movable together while remaining parallel;

(c) a plurality of equally spaced apart, elongate bracing member rows slidably positioned on the support surface in parallel relationship between said working faces, said bracing member rows being movable together, by the closing action of the working faces, through equal and limited travel distances; and (d) means for biasing or closing the working faces together.

In an alternative version of the previously described embodiment, one could substitute a movable member for the fixed stop member and connect such movable member with means, such as a cylinder, for controllably advancing said substitute member toward the previously described biasing member. The end result would be two biasing members simultaneously pushing the bracing member rows together through equal travel distances in parallel formation.

An assembly 18 of links 19 is pivotally interconnected with each pair of adjacent rows of bracing members and extends therebetween.

Each link assembly 18 comprises two rows 18a, 18b formed of entire links 19 or sections thereof. An "entire" link 19 is illustrated in FIG. 7.

Each link row 18a is formed end-to-end of entire links 19. The links of each said row 18a dovetail at one end thereof with the bracing members of a bracing member row 9a.

Each link row 18b is formed of an array of entire links 19 having an end link 20 at each end thereof. The end links 20 are each a longitudinal half section of an entire link 19.

The links of each row 18b dovetail at one end with the links of a row 18a and are pivotally interconnected therewith by a rod 21 which extends through transverse bores formed through the link ends. At their opposite end, the links of each row 18b dovetail with the bracing members of a row 9b and are pivotally interconnected therewith by a rod 22.

At the stop member end of the platen 13, there is provided a link row 18b whose links at one end abut the stop member 6. This link row 18b is provided with rollers 23 to permit the row to ride up and down on the vertical working face 24 of said stop member 6.

This mechanical assemblage is characterized by the following:

(1) the bracing member rows are fixed to the base plate by the key and key-way interconnections—they can shift along the length of the base plate toward each other in parallel formation, but they remain at a constant elevation;

(2) the pivoting link means are functional to pivot upwardly into a V-like position when the bracing member rows are forced together.

Thus the dovetailing pivoting link means and slidable bracing member means combine to provide a broad, substantially non-porous platen whose surface configuration can be mechanically converted, between a substantially planar form and a corrugated form, by the sideways pincer action of the biasing and stop members.

It is intended that the platen assembly be used to form wafer board from a mat of binder-coated wafers. Heat is needed in such process. Therefore, heating means are required to heat the platen 13. In the embodiment shown, electrical heating rods 25 are provided to extend through transverse bores 26 formed through the links.

Figure 1B:
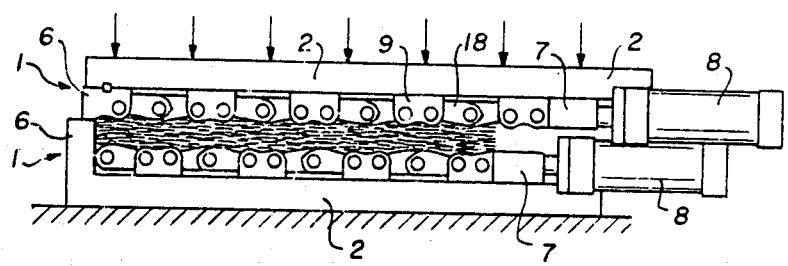
Figure 1C:
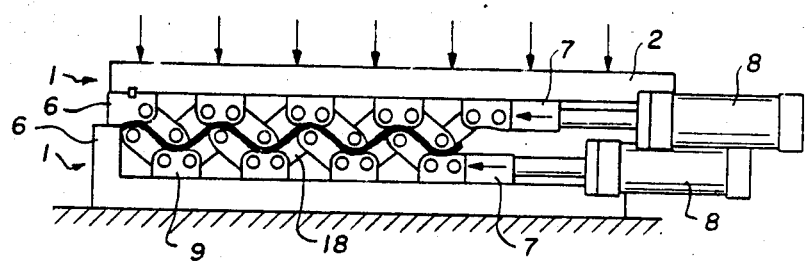

FIGS. 1a, 1b, 1c show two horizontal assemblies 1 arranged in spaced, opposed top and bottom arrangement. Conventional press members (not shown) may be connected to the platen assemblies 1, for biasing the latter together in a vertical direction and applying pressure thereto.

To produce corrugated wafer board, a loose mat 27 of thermosetting resin binder-coated wafers is positioned between the fully extended, planar top and bottom platen assemblies 1, as shown in FIG. 1a. The press members are actuated to force the flat platen assemblies 1 toward each other and pre-compress the mat to substantially fix the wafers together, to prevent their relative movement. Typically, a 4" thick mat would be compressed to about a 1 inch thickness. The so precompressed mat is substantially free of density variations. The cylinders 8 are then expanded to cause the biasing members 7 of the two platen assemblies 1 to move toward the stop members 6, thereby simultaneously applying a horizontal force at the same rate to the link rows 18a, 18b, to pivot them into the corrugated configuration, while the pre-compressed mat is held between the opposed surfaces of the platens 13. Heat and final pressure is then applied by the platen assemblies 1 to the corrugated mat, via the electrical heating rods 25, to cure the binder and produce a cohesive corrugated wafer board of desired final thickness, typically ½ inch.

The embodiments of the invention in which an exclusive property or privilege is claimed are defined as follows:

1. A process for producing corrugated wafer board panel from binder-coated wafers, comprising:

distributing a mat of loose binder-coated wood wafers between a pair of spaced apart, substantially horizontally disposed platens having substantially non-porous and planar platen surfaces, said platens being adapted to be mechanically actuated to move the surfaces together and, when further required, to be converted from the planar configuration to a corrugated configuration by application of a side force;

biasing the platens together vertically to pre-compress the mat between the planar surfaces, to substantially fix the wafers together to limit their further relative movement;

then converting the two platens and their platen surfaces, still in pressing association with the mat, from the planar to the corrugated configuration;

and applying heat and additional pressure with the platen surfaces to the mat for sufficient time to cure the binder and produce a corrugated wafer board panel.

* * * * *